Oct. 16, 1934.  W. A. LOCKHART  1,977,135
GLASS CUTTING MACHINE
Filed Oct. 13, 1930  4 Sheets-Sheet 1
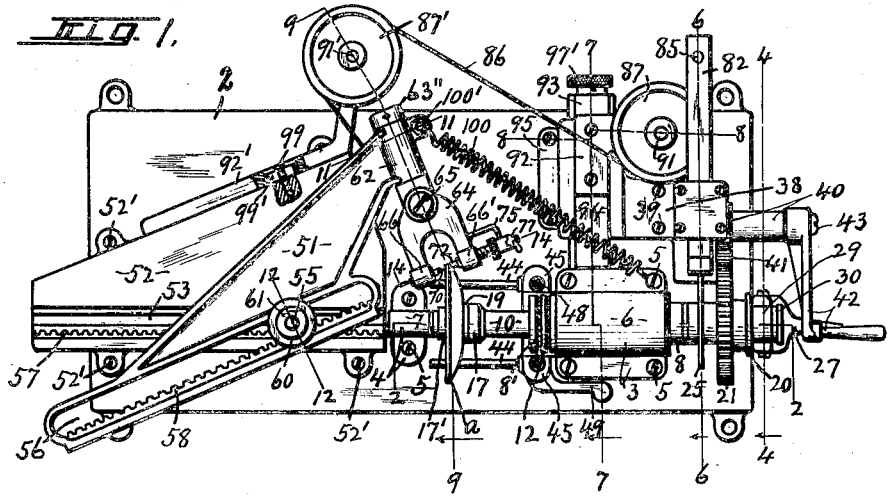
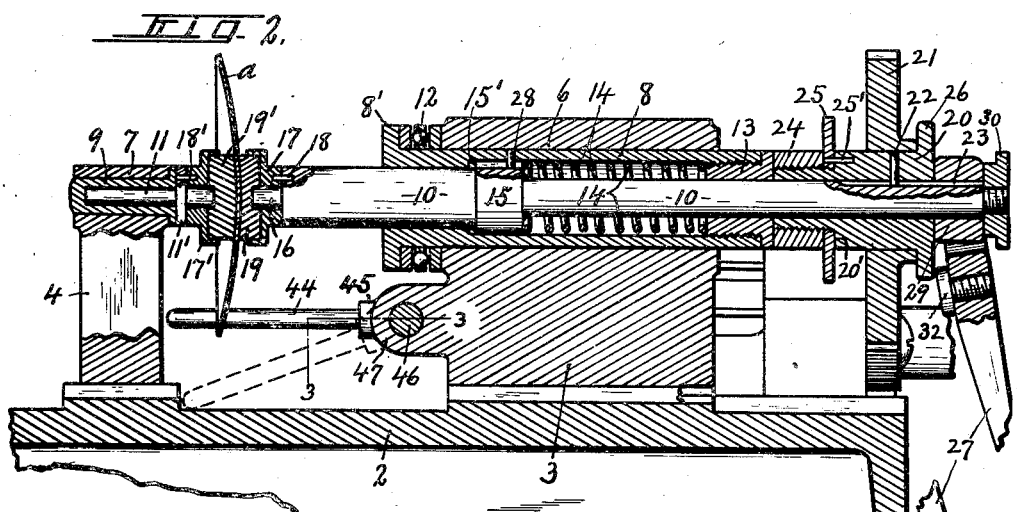
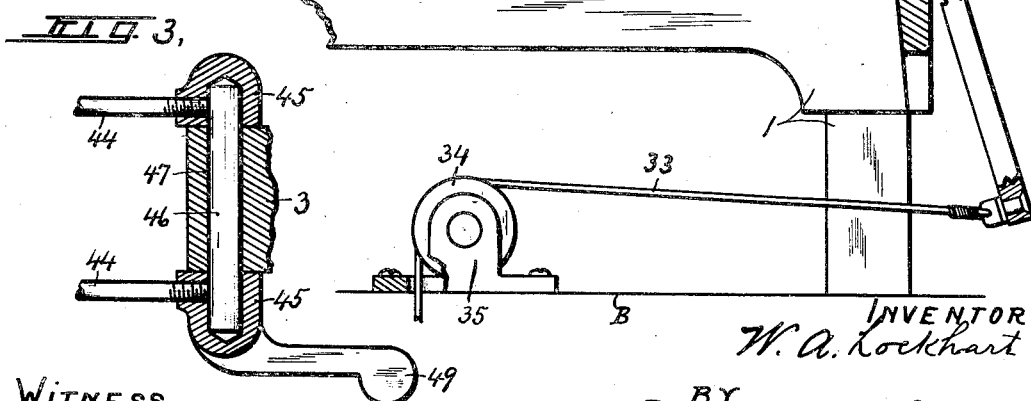
WITNESS
J. J. Mains
INVENTOR
W. A. Lockhart
BY
Denison & Thompson
ATTORNEYS

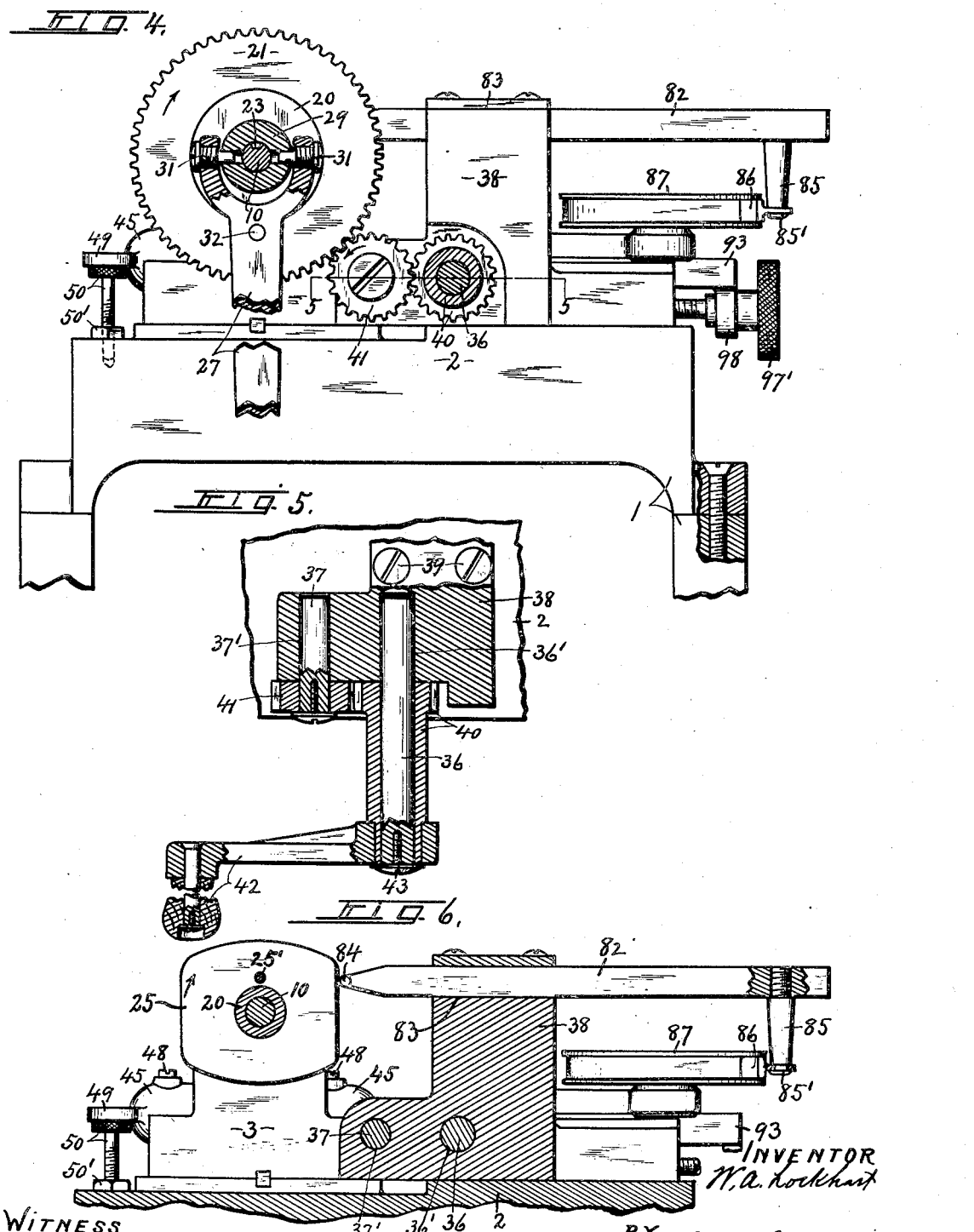

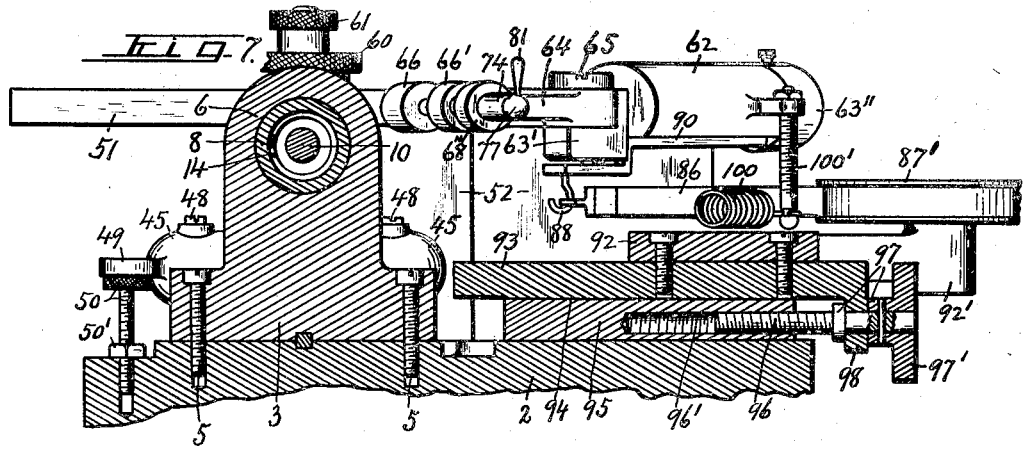
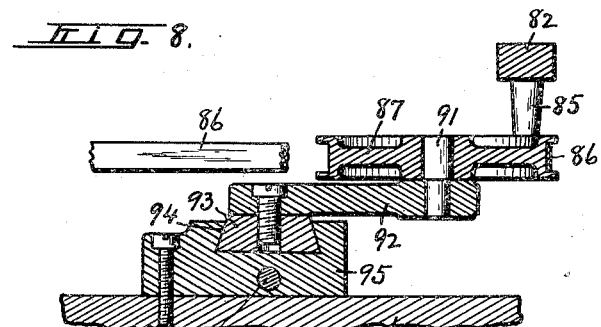
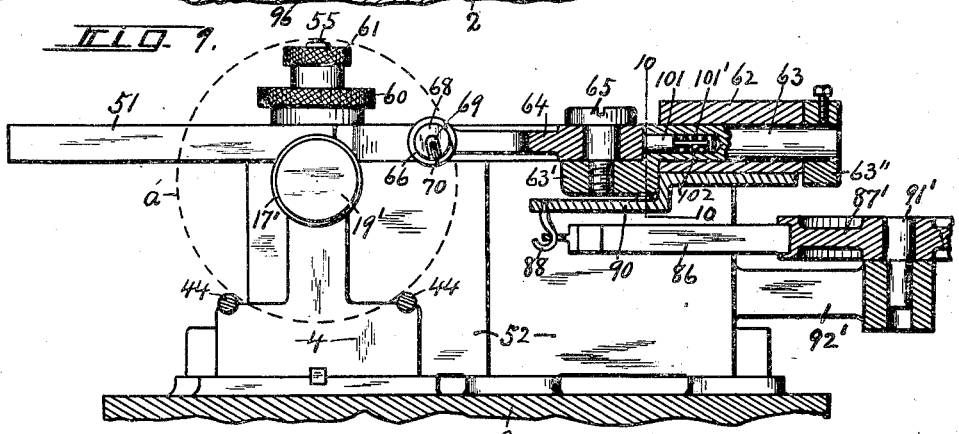
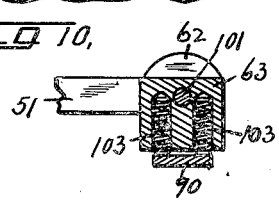

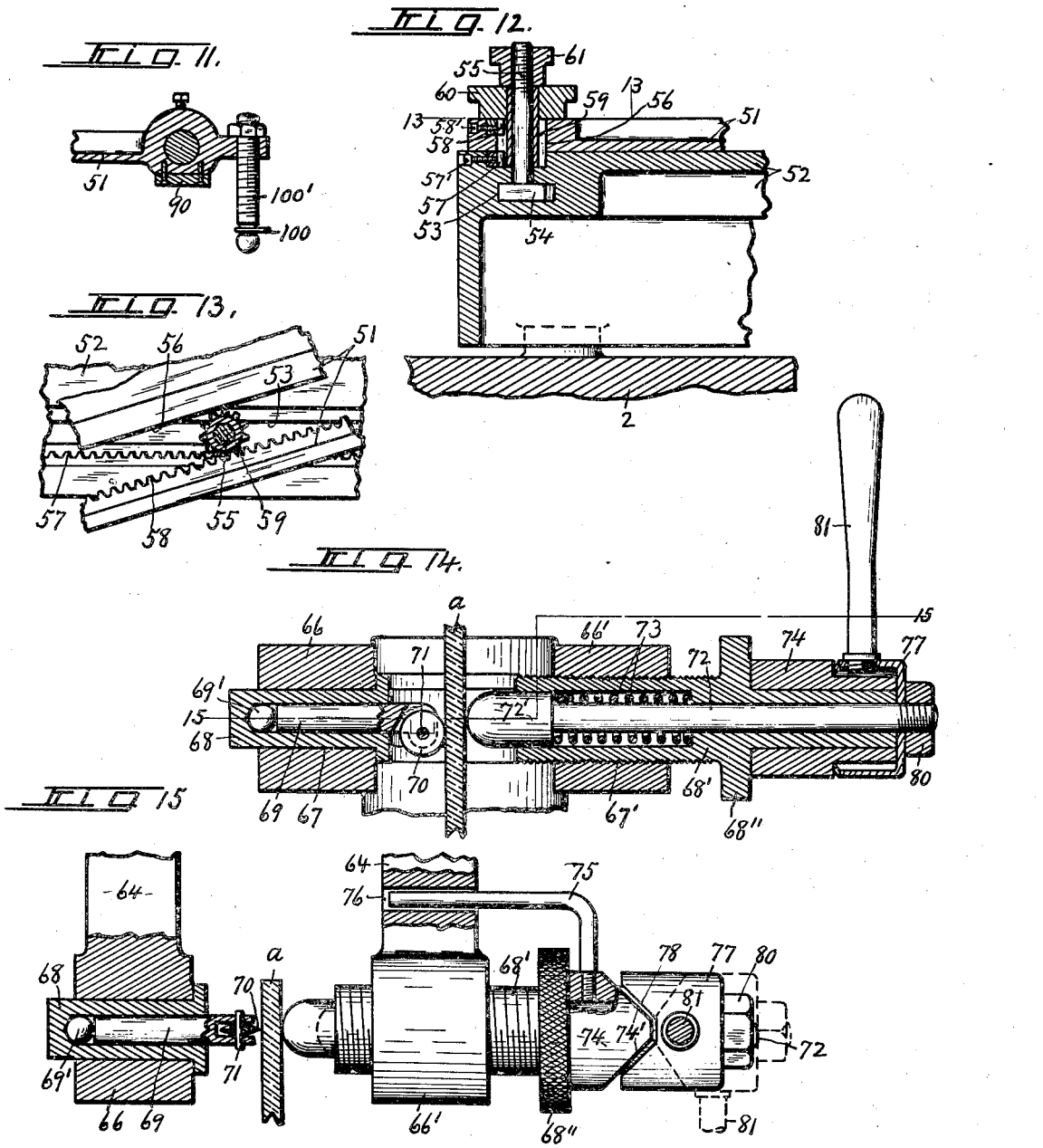

Patented Oct. 16, 1934

1,977,135

UNITED STATES PATENT OFFICE 1,977,135

GLASS CUTTING MACHINE

William A. Lockhart, Geneva, N. Y., assignor to Shuron Optical Company, Inc., Geneva, N. Y., a corporation of New York Application October 13, 1930, Serial No. 488,399

24 Claims. (Cl. 33—28)

This invention relates to a machine for cutting glass disks or plates of the same or different surface-contours into useful articles having widely varying peripheral or perimetral shapes or outlines and refers more particularly to the cutting of lenses for spectacles, eye-glasses, goggles and other optical instruments.

The blank-disks or plates from which the articles are to be cut are usually ground and polished or otherwise finished to the required surface contour, varying from plane surfaces to curved surfaces of different radii, and the main object of the present invention is to provide a simple, compact and efficient machine by which articles of various sizes and shapes may be more expeditiously and accurately cut to certain prescribed forms than has heretofore been practiced with a minimum liability of breaking or otherwise impairing said articles.

In this particular machine, the blanks to be cut are supported in a rotary work-holder to rotate therewith about the axis thereof, and one of the specific objects is to support the cutter in such manner that it may be free to move transversely of said axis and substantially parallel with the surface of the work engaged thereby or, if said surface is curved, about the center of curvature.

In other words I have sought to provide adjustable means whereby the cutter may be caused to move through arcs of different radii corresponding approximately to the radii of the surfaces of different blanks operated upon.

Another object is to support the cutting-tool in such manner that it will automatically assume a cutting position substantially normal to the surface of the work engaged thereby, and also tangential to all points in the perimeter of the work.

A further object is to provide means, including a pattern and back-rest therefor, for controlling the movement of the cutter across the surface of the work.

Other objects and uses relating to specific parts of the machine will be brought out in the following description.

In the drawings:—

Figure 1 is a top plan of a glass-cutting machine embodying the various features of my invention, showing a portion of the supplemental base and tape-roll bracket in section to indicate the adjustability of the bracket.

Figure 2 is an enlarged vertical sectional view taken in the plane of line 2—2, Figure 1, showing means, partly broken away, for shifting one of the lens-holding spindles axially.

Figure 3 is a detail sectional view taken in the plane of line 3—3, Figure 2.

Figure 4 is an enlarged vertical sectional view taken in the plane of line 4—4, Figure 1.

Figure 5 is a detail horizontal sectional view taken in the plane of line 5—5, Figure 4.

Figures 6, 7, 8 and 9 are enlarged detail sectional views taken respectively in the planes of lines 6—6, 7—7, 8—8 and 9—9, Figure 1.

Figure 10 is a detail sectional view taken in the plane of line 10—10, Figure 9.

Figures 11 and 12 are enlarged detail sectional views taken respectively in the planes of lines 11—11 and 12—12, Figure 1.

Figure 13 is a horizontal detail sectional view taken in the plane of line 13—13, Figure 12.

Figure 14 is an enlarged detail sectional view taken in the plane of line 14—14, Figure 1.

Figure 15 is a detail sectional view taken in the plane of line 15—15, Figure 14.

As illustrated, this machine comprises a main supporting frame or base 1 adapted to be supported on the floor or upon a bench according to the requirements or convenience of the user and includes a substantially horizontal bed-plate 2 for receiving and supporting longitudinally spaced bearing blocks 3 and 4 which are releasably secured to said bed-plate by bolts 5 or equivalent fastening means, as shown more clearly in Figure 7.

These bearing blocks 3 and 4 are provided with co-axial journal bearings 6 and 7 respectively for receiving and supporting a rotary work-holder, including separate co-axial shaft sections 8 and 9 and separate co-axial spindles 10 and 11, as shown more clearly in Figure 2.

The shaft section 8 is journaled in the bearing 6 and extends beyond the opposite ends thereof, the inner end being provided with an annular flange 8' in spaced relation to the adjacent end of the bearing 6 for receiving an anti-friction end thrust bearing 12, Figure 2.

The outer end of the shaft 8 is threaded internally and engaged by a bushing 13 having its outer end enlarged to abut against the adjacent end of the shaft, which latter is hollow or tubular for receiving a coil-spring 14 having its outer end engaged with the inner end of the bushing 13 and its other end engaged with an annular shoulder 15 on the spindle 10, as shown in Figure 2, for urging said spindle endwise toward the opposed spindle 11, the inward movement of the spindle 10 being limited by the engagement of the annular shoulder 15 with a cooperative stop shoulder 15' on the adjacent portion of the shaft 8.

The extreme inner end of the spindle 10 is reduced at 16 for receiving and supporting a socketed head 17 which is locked to the adjacent end of the shaft by a key or pin 18 loosely inserted in a corresponding socket in the adjacent end of the spindle 10 so that the head 17 may be displaced endwise from the spindle.

A resilient pad 19 is seated in the socketed inner end of the head 17 to engage one side of the article as $a$ to be cut. The inner end of the shaft 9 is enlarged and engaged with the adjacent end of the bearing 7 to hold the spindle against outward displacement.

The spindle 11 is provided near its inner end with an annular shoulder 11' abutting against the adjacent end face of the shaft 9 to hold said spindle against outward displacement while permitting its displacement inwardly. Figure 2.

A socketed head 17' is mounted upon the inner end of the spindle 11 and is releasably locked to the flange 11' by means of a key or pin 18' to permit the head to be displaced inwardly from the spindle.

A resilient pad 19' is seated in the socketed inner end of the head 17' to engage the adjacent face of the article $a$ in opposed relation to the resilient pad 19 for holding the article $a$ in operative position between the pads and co-axial with both of the spindles 10 and 11.

The work-holding spindle 10 extends outwardly some distance beyond the outer end of the shaft 8 and its bushing 13 for receiving and supporting a collar 20 upon which is mounted a gear 21 forming a part of the driving mechanism for the spindle 10 and shaft 8.

The gear 21 is tightly fitted upon the periphery of the collar 20 which is splined to the adjacent end of the spindle by means of a pin or key 22 engaging in a keyway 23 in the periphery of the spindle 10 as shown in Figure 2.

The inner end of the collar 20 is reduced in diameter to form a shoulder 20' and is threaded externally for receiving a nut 24 which, together with the adjacent end of the collar 20, normally abut against the outer end face of the bushing 13.

A pattern member 25 is mounted upon the reduced inner end of the collar 20 between the shoulder 20' and nut 24 and is releasably locked to the collar 20 by means of a key or pin 25' to rotate with the collar and also to permit the removal and replacement of the pattern 24 when the collar 20 is removed from the spindle and the nut 24 removed from the collar, thus permitting the use of patterns of different forms which determine the form of the article cut from the blank $a$.

Spindle shifting means

The outer end of the collar 20 is provided with an annular flange 26 engaging the hub of the gear 21 and forming a fulcrum bearing for a shifting lever 27 by which the spindle 10 and work-engaging pad 19, mounted thereon, may be withdrawn endwise against the action of the spring 14 to release said pad from engagement with the work $a$ and thus permit the article to be removed after being cut to the required form.

The engagement of the key-pin 22 in the keyway 23 permits axial movement of the spindle 10 within and relatively to the collar 20 and at the same time maintains driving connection between the gear 21 and spindle 10 by reason of the tight fitting of the gear upon said collar.

Rotary motion is also transmitted from the spindle 10 to the shaft 8 through the medium of the key-pin 28 which engages in a keyway in the periphery of the shoulder 15 on the spindle, shown in Figure 2, said key-pin and keyway also permitting lengthwise movement of the spindle in the manner previously explained.

A collar 29, Figure 2, is loosely mounted upon the outer end of the spindle 10 between the fulcrum bearing 26 and a nut 30 which is screwed upon the outer end of the spindle to hold the collars 29 and 20 against axial displacement.

The upper end of the lever 27 is forked to extend around opposite sides of the collar 29 and is provided with pivotal pins 31 engaging in radial sockets in said collar to establish pivotal connection between the lever and collar. Figure 4.

This lever extends downwardly from its pivotal connection with the collar 29 and is provided with a bearing member 32 just below the collar 29 for engaging the fulcrum bearing 26 on the outer end of the collar 20, as shown in Figures 2 and 4.

The extreme lower end of the lever 27 is connected to an operating cord or cable 33 which extends inwardly lengthwise of the machine below the bed plate 2 and thence downwardly around a suitable sheave 34 for connection with a pedal or other operating member, not shown, the sheave 34 being supported upon a bracket 35 which is secured to the bench as B, or other suitable support.

When it is desired to insert the work $a$ or remove it from between the clamping pads 19 and 19', the cable 33 may be drawn endwise, thereby effecting a corresponding movement of the lower end of the lever 27 and simultaneously withdrawing the spindle 10 against the action of the spring 14, for opening the clamping pads 19 and 19' to permit the insertion and withdrawal of the work $a$ between them, it being understood that when the tension upon the cable 33 is released the spring 14 will return the spindle 10 to its clamping position and at the same time restore the lever 27 to its normal position.

Spindle driving means

Inasmuch as the article may be cut from the blank by one or more revolutions thereof, the spindle 10 is preferably rotated by hand or other means and for this purpose a pair of stub shafts 36 and 37 (Fig. 5) are tightly fitted in corresponding sockets 36' and 37' in a supporting bracket 38 which is secured by clamping screws 39 to the upper face of the bed plate 2 to extend outwardly from said bracket parallel with, and at the rear side of, the spindle 10, as shown more clearly in Figures 4 and 5.

The stub shaft 36 extends outwardly some distance beyond the stub shaft 37 and serves to receive and support a driving pinion 40 meshing with an idler pinion 41, which in turn meshes with the gear 21 for transmitting rotary motion to the spindle 10.

The hub of the pinion 40 also extends outwardly some distance beyond the idler 41 and has its extreme outer end reduced in diameter for receiving a hand crank 42 which is held in place against displacement by a clamping screw 43, Figure 5.

It is now evident that the rotation of the crank arm 42 will transmit rotary motion to the spindle 10 through the medium of the gears 40, 41 and 21 and that when the blank $a$ is clamped between the pads 19 and 19' similar rotation will be transmitted thereto to cooperate with a cutting mechanism, presently described, for cutting the article from the blank.

Centering device

The peripheral or perimetral contour of the pattern 25 determines the corresponding contour or shape of the article cut from the blank a and therefore the latter, which is preferably circular, must be placed between the pads 19 and 19', coaxial with the pattern or co-axial with the spindle 10 and for this purpose a pair of centering pins 44 are secured to suitable heads 45 on opposite ends of a rock shaft 46 which is journaled in a bearing 47 on the inner end of the bracket 3 in a plane at right angles to and some distance below the spindle 10, as shown more clearly in Figures 2 and 3.

These centering pins 44 extend radially from opposite ends of the rock shaft 46 beyond the meeting faces of the work-supporting pads 19 and 19', lengthwise of the spindle 10 and equal distances from the vertical plane of the axis of the spindle so that when adjusted for use by the rocking of the shaft 46 the portions thereof engaged by the circular blank a will be a distance from the axis of the spindle substantially equal to the radius of the blank as shown more clearly in Figures 2 and 9.

The heads 45 are secured to opposite ends of the rock shaft 46 by set screws 48 (Fig. 6), one of said heads being provided with a finger piece 49 (Fig. 3) projecting radially therefrom in a direction opposite the centering pins 44 for rocking said pins from their normal positions, shown by dotted lines in Figure 2, to their operative positions shown by full lines in the same figure.

The downward movement of the finger piece 49 and consequently the upward rocking movement of the centering pins 44 is limited by stop screw 50 having its lower threaded end engaged in a threaded socket in the underlying portion of the base plate 2 and its upper end disposed in the path of movement of the finger piece 49, said stop screw being held in its adjusted position by the lock nut 50', Figures 4, 6 and 7.

This stop screw is adjusted vertically to limit the downward movement of the finger piece 49 and resultant upward swinging movement of the centering pins 44 to properly position said pins for engaging and centering blanks a of different diameters.

For example, when blanks of known diameter are to be cut the stop screw 50 will be adjusted to limit the downward movement of the finger piece 49 and thereby to position the centering pins 44 radial distances from the axis of the spindle 10 corresponding to the radius of the blank.

The clamping jaw 19 will then be opened by the operation of the lever 27 and the finger piece 49 depressed by hand against the stop 50, whereupon the blank a will be inserted between the jaws 19 and 19' until its lower edge rests upon the previously adjusted centering pins 44.

The spindle 10 carrying the jaw 19 may then be released to allow the spring 14 to clamp the blank a between the jaws after which the finger piece 49 may be released ready for the cutting operation, presently described.

Cutting mechanism

As previously intimated the various contours of different blanks a to be cut may vary within prescribed limits from substantially plain surfaces of relatively long radius to those of relatively short radius or curvature, while the peripheral or perimetral contour may also be irregular or of widely varying shapes corresponding to that of the pattern 25, and in order to meet these conditions and render the cutting operation automatic during the rotation of the work a, the cutting tool is mounted in a manner hereinafter described upon a radius arm 51 pivotally mounted upon a supplemental supporting base 52 to swing in a horizontal plane about a vertical axis intersecting the axis of the work-holder at the outer end of the spindle 11, the supplemental base 52 being secured by bolts 52' to the main supporting base 2.

Suitable means, presently described, is provided for adjusting the pivotal support for the radius arm 51 along the axis of the work-holder toward and from the work for varying the radius of the arc of movement of the cutter to correspond to the radius of curvature of the work operated upon by said cutter.

Additional means, controlled by the pattern 25, is also provided for automatically rocking the radius arm 51 about its pivot and thereby shifting the cutting tool transversely of the work, particularly when different portions of the perimeter of the pattern are of different radii, thereby causing the work a to be cut to correspond exactly to the shape of the pattern.

As illustrated, in Figures 1, 12 and 13, the supplemental frame 52 is provided with a T-shaped slot 53, for receiving the head 54 of a pivotal bolt 55, the slot 53 being parallel with the axis of the work-holder and having its longitudinal center in the vertical plane of said axis to permit the pivotal bolt 55 to be adjusted toward and from the work a.

The radius arm 51 rests flatwise upon the upper surface of its supporting member 52 for rocking movement about the axis of the pivotal bolt 55 and is provided with a lengthwise slot 56 of approximately the same length as the slot 53, said slot 56 being movable from a position parallel with the slot 53 to different angles relatively thereto as the radius arm 51 is moved about its pivotal bolt 55.

Corresponding walls of the slots 53 and 56 are provided respectively with lengthwise toothed racks 57 and 58 which are releasably held in place by shoulders or screws 57' and 58', as shown in Figure 12 to permit them to be replaced when impaired.

These toothed racks 57 and 58 are engaged by one and the same side of a pinion 59 which is journaled upon the pivotal bolt 55 and extends upwardly through the slot 56, the hub of the pinion 59 being extended above the upper surface of the radius arm 51 and provided with a hand wheel 60 by which the pinion may be turned.

The pivotal bolt 55 extends upwardly through the pinion 59 and hand wheel 60 and is preferably threaded at its upper end and engaged by a clamping nut 61 for tightening and releasing the pivotal bolt and pinion in and from their adjusted positions along the slots 53 and 56 and also for holding the pinion against turning movement when the nut is tightened.

When it is desired to change the radius of oscillation of the tool holder it is simply necessary to loosen the nut 61 and then to rotate the pinion 59 by means of its hand wheel 60, thereby causing the pinion to travel along both of the racks 57 and 58 until the axis of the pivotal bolt is positioned at a predetermined distance from the work corresponding to the radius of curvature of said work engaged by the cutter after which the nut 61 may be tightened by hand or otherwise to hold the pivotal bolt 55 and pinion 59 in fixed positions relatively to the radius arm 51 and its supporting member 51 without interfering with the free oscillation of the radius arm about the axis of the pivot, in a manner presently described, Figures 1, 12 and 13.

The inner end of the radius arm 51 is provided with a rearwardly offset journal bearing 62 for receiving a yoke shaft 63 having its axis disposed in a horizontal plane above the axis of the work-holder spindles 10 and 11 at right angles to the longitudinal center of the slot 56, the front end of the shaft 63 being provided with a downwardly projecting offset ledge 63' in a plane below the axis thereof for engaging the front end of the bearing 62 to hold the shaft 63 against rearward movement while the rear end of the same shaft is provided with a tight collar 63'' engaging the rear end of the bearing to hold the shaft against forward movement. See Figures 7 and 9.

A rocker arm 64 is pivoted at 65 to the ledge 63' of the rock shaft 63 to extend forwardly therefrom and has its front end bifurcated and its opposite arms provided with bearings 66 and 66' located respectively at opposite sides or ends of the rear portion of the blank $a$ to be cut, as shown more clearly in Figures 1, 7, 9, 14 and 15.

These bearings 66 and 66' are provided with co-axial bushings 68 and 68', the bushing 68 being tightly fitted with the opening 67 and provided with a central socket for receiving a tool-holding spindle 69 which is free to turn therein and carries at its inner end a cutting tool 70, Figures 14 and 15. The outer end of the bushing 68 is preferably closed for receiving an end thrust ball bearing 69' for the adjacent end of the spindle 69.

As illustrated, the inner end of the spindle 69 is bifurcated for receiving the cutting tool 70 which is journaled upon a pin 71 in the opposite arms of the inner end of the spindle 69, said pivotal pin 71 and cutting wheel 70 being offset to one side of the axis of the spindle 69 so that when the work $a$ is rotated against the cutting edge of the cutter the spindle 69 will be free to turn about its axis to cause the cutting edge of the cutter to assume a position normal to the portion of the surface of the work operated upon, and also tangential to all cutting points in the perimeter of the work. (See Figures 14 and 15.)

It is evident, however, that any other form of cutting tool such as a diamond offset in the manner described to one side of the axis of its supporting spindle will produce the same automatic or self-adjustment to the work tangential thereto.

The bearing 66' is threaded internally while the bushing 68' is threaded externally and engaged with the internal thread of the bearing 66' so that the bushing may be adjusted axially toward and from the corresponding side of the work in opposed relation to the cutting tool, as shown in Figures 14 and 15, the outer end of the bushing being provided with a hand wheel 68'' by which it may be rotated.

A pressure spindle 72 is movable axially of and within the bushing 68' and is provided with an enlarged inner end or head 72' having a rounded inner end face for engaging the work $a$ in directly opposed relation to the cutter 70, the inner end of the spindle being yieldingly held against the work by means of a coil spring 73, as shown in Figure 14, thus forming a back rest for the portion of the work engaged by the cutter.

The bushing 68' is extended outwardly some distance beyond the hand wheel 68'' and is reduced in diameter for receiving and supporting a cam-collar 74 having its outer end provided with a V-shaped cam 74', said collar being also provided with a laterally projecting L-shaped arm 75 engaging in an opening 76 in the bearing 66' for holding the collar against relative rotation without in any way interfering with the free angular movement of the bushing 68' through the medium of its hand wheel 68'', as shown more clearly in Figure 15.

An additional cam-collar 77 is rotatably mounted upon the outer end of the spindle 72 to extend over the periphery of the adjacent end of the collar 74 and is provided with a V-shaped cam face 78 cooperating with the cam 74 for moving the spindle 72 endwise out of engagement with the work $a$ against the action of the spring 73 when the collar 77 is adjusted angularly for registering its higher points with those of the collar 74.

The extreme outer end of the spindle 72 is threaded and engaged by a nut 80 which in turn engages the outer end face of the collar 77 for transmitting axial motion from said collar to the spindle, the collar 77 being provided with a radially projecting handle 81 by which it may be turned about the axis of the spindle 72.

That is, when it is desired to place the blank $a$ between the clamping members 19 and 19' or to remove the blank from between said clamping members, the cam-collar 77 will be adjusted angularly by means of its handle 81 to register its high points with the high points of the cam-collar 74, thereby withdrawing the pressure spindle 72 against the action of the spring 73, and permitting the removal or replacement of the blank $a$ from between the clamping members 19 and 19'.

When the blank $a$ is placed in operative position between the clamping members 19 and 19' to rest upon the previously adjusted centering pins 44, the portion of the blank to be cut will be interposed between the cutter 70 and inner end of the spindle 72, whereupon the collar 77 may be adjusted angularly by means of its handle 81 to register the low points of its cam 78 with the high points of the cam 74, thus allowing the spring 73 to press the spindle 72 endwise into engagement with the blank $a$ directly opposite the cutter 70.

Then, if the article to be cut from the blank is circular and concentric with its axis of rotation, the circular article may be cut from the blank by simply rotating the spindle 10 through the medium of the hand crank 42 and its gear connections with the spindle with the assurance that the pressure of the spindle 72 against the blank will be yieldingly maintained at all times by the action of the spring 73.

It is evident, however, that if the article to be cut from the blank $a$ is otherwise than circular or any portion of its perimeter is eccentric to said axis it will be necessary to use a pattern as 25 of the form required and to provide means controlled thereby for automatically rocking the radius arm 51 about the axis of its pivotal pin 55 for effecting a corresponding movement of the cutter 70 and pressure spindle 72 toward and from the axis of the spindle 10 and transversely of the surfaces of the work engaged thereby.

For this latter purpose a back-rest 82 is reciprocally movable endwise in a guideway 83 in the upper portion of the bracket 38 in the plane of rotation and at the rear of the pattern 25 and has its forward end provided with a hardened steel bearing pin 84 yieldingly held in a manner hereinafter described against the perimeter of the pattern as shown more clearly in Figures 1, 4, 6, 7 and 9.

The rear end of the back-rest 82 is provided with a pendant post 85 having its lower end connected at 85' to one end of a metallic tape 86 which is passed around the front side of a sheave 87 and also around the rear side of another sheave 87', Figure 1, and has its other end connected to a hook 88 on the underside of a supporting plate 90, which is bolted or otherwise secured to the underside of the bearing member 62 on the radius-arm 51 as shown more clearly in Figures 1, 7, 9 and 11.

The back-rest 82 and adjacent end of the tape 86 attached thereto are movable in a plane at right angles to the axis of the spindle 10 and substantially tangential to the one side of the sheave 87 which is journaled upon a vertical spindle 91 on a bracket 92, the latter being bolted or otherwise secured to a slide bar 93, as shown more clearly in Figure 7.

The slide bar 93 and its sheave supporting bracket 92, together with the sheave 87 are adjustable transversely of the axis of the spindle 10 at right angles thereto and therefore parallel with the back-rest 82 to effect a corresponding adjustment of the back-rest 82 towards and from the axis of the pattern 25 to conform to patterns of different sizes and for this purpose the slide bar 93 is mounted in a suitable guideway 94 on a supporting block 95 which is bolted or otherwise releasably secured to the upper face of the main supporting base 2. See Figures 1 and 7.

The means for adjusting the slide bar 93 comprises a screw 96 engaging in a threaded socket 96' in the block 95 and provided with shoulders 97 engaging opposite sides of a pendant lug 98 on the rear end of the sliding bar 93, as shown more clearly in Figure 7, the rear shoulder 97 being provided with a hand wheel 97' by which the screw 96 may be turned to effect the desired adjustment of the sheave 87 and back-rest 82.

The object of the slide bar 93 is to vary the size of the lenses cut according to a single pattern so that by moving the slide 93 and sheave 87 in one direction will cause an increase in the size of the lens, while the movement of the same parts in an opposite direction will diminish the size of the lens.

The other sheave 87' is also mounted upon a vertical spindle 91' which in turn is mounted upon the rear end of a bracket 92', the latter being adjustably secured to the rear face or edge of the supplemental base 52 by means of a clamping screw 99 and slot 99', as shown in Figure 1.

A coil spring 100 is attached at one end by means of one of the clamping bolts 5 to the bearing 6 and has its other end attached at 100' to the bearing 62 on the radius arm 51, as shown in Figure 1, the object of which is to yieldingly urge the adjacent end of the radius-arm forwardly and at the same time to keep the tape 86 under tension so as to yieldingly urge the back-rest 82 against the rear edge of the pattern 25, see Figure 1.

In other words the tensioned tape 86 constitutes a connection between the rear end of the bracket-rest 82 and inner end of the radius-arm 51 while the spring 100 serves to keep the tape under tension and incidentally to hold the front end of the back-rest 82 in yielding contact with the rear edge of the pattern 25 so that any variation in the radius of the portion of the pattern 25 contacting with the front end of the back-rest 82 will be transmitted through said rest and tape to the inner end of the radius-arm 51 and thence through the yoke 64 to the cutter 70 and pressure spindle 72.

For example, any portion of the pattern 25 of relatively long radius contacting with the front end of the back-rest 82 will automatically move said back-rest rearwardly and, through the medium of the tape 86, will cause a corresponding rearward movement of the inner end of the radius-arm 51, together with the cutter to cut the blank *a* to exactly the same form as the pattern.

It is, of course, understood that when the portions of the pattern 25 of lesser radius are presented to the front end of the back-rest 82, the tension of the spring 100 and tape 86 will simultaneously draw the back-rest 82 into engagement with the perimeter of the pattern 25 and also move the inner end of the radius-arm 51 forwardly until limited by contact with the back-rest 82 with the pattern, thereby causing a corresponding movement of the cutter 70 and pressure spindle 72 to effect the cutting of the blank *a* in exact conformity to the shape of the pattern 25.

As previously stated, the yoke 64 carrying the cutter 70 and pressure spindle 72 are free to rotate about the axis of the spindle 63 and also about the axis of the pivot 65, the object of which is to enable the cutter and pressure spindle to automatically adjust themselves to varying contours of the blank *a* operated upon while the eccentric arrangement of the cutter 70, relatively to its spindle 69, causes said cutter to assume a position tangential to all cutting points in the perimeter of the work engaged thereby as the work is rotated against the cutter.

A friction pin 101 and an actuating spring 101' are arranged in a socket 102 in the inner end of the yoke spindle 63, as shown in Figure 9, said friction pin being arranged to engage the adjacent end face of the yoke member 64 to frictionally hold the latter against undue turning movement about its pivotal pin 65 and at the same time to cause the cutter 70 and pressure pin 72 to maintain contact with the opposite faces of the blank *a* during the cutting operation.

In Figure 10 is shown a pair of coil springs 103 arranged in sockets at opposite sides of the axis of the spindle 63 to extend slightly below the lower face of the ledge 63' for engagement with the underlying portion of the plate 90, thus permitting slight rocking movement of the yoke members 63 and 64 about the axis of the spindle 63 against the action of the springs 103 which serve to yieldingly hold the yoke members in their normal positions and also enable the cutter 70 and pressure pin 72, to automatically adjust themselves to varying contours of the surfaces of the blank engaged thereby.

*Operation*

The pattern 25 of certain prescribed peripheral contour is first placed in operative position upon the collar 20 and clamped in place in the manner described after which the glass blank *a* to be cut is placed in operative position between the clamping pads 19 and 19' and held in place by the action of the spring 14 upon the spindle 10, it being understood that the blank *a* will be properly centered by the centering pins 44 in the manner previously explained.

The pivotal pin 55 for the radius-arms 51 will then be adjusted along the racks 57 and 58 respectively to position its axis at the center of curvature of the blank $a$ engaged by the cutter 70, the pivotal pin 55 being then clamped tightly to the supplemental base 52 by means of the clamping nut 61 to hold it in its adjusted position.

During this operation the radius bar 51 will be adjusted to bring the cutter 70 and pressure pin 72 into engagement with opposite faces of the blank $a$, which adjustment may be controlled by the adjusting screw 97' and slide bar 93.

The hand crank 42 is then turned to rotate the blank $a$ one or more turns against the cutter 70 during which operation the front end of the back-rest 82 will maintain contact with the perimeter of the pattern 25 and through the medium of the tape 86 will cause the cutter 70 to cut the blank $a$ in exact conformity to the shape of the pattern.

When the cutting operation is completed upon each blank the spindle 10 may be withdrawn against the action of the spring 14 by means of the operating lever 27 and cord 23 to permit the cut blank to be withdrawn from between the pads 19 and 19' and its marginal portion removed along the line of the cut, leaving the article cut therefrom of the same peripheral contour as that of the pattern, thus completing the cycle of operation upon one of the blanks, the machine being then ready for repeating the operation upon another blank of the same or different form.

It will be noted that the offset mounting of the cutter 70 upon the spindle 69 and the free turning of the spindle enables the cutter to automatically assume a position tangential to all cutting points in the perimeter of the lens and also at substantially right angles (or normal) to the portion of the surface of the lens operated upon according to the peripheral shape and surface contour of the pattern 25.

The machine is therefore capable of automatically cutting irregular shapes with sharp corners and abrupt curves with the utmost precision and accuracy as the work is rotated.

It will also be noted that the back-rest 82 for the pattern 25 is mounted in a plane above the axis of rotation of the pattern to enable said back-rest to slide freely over flat portions as well as other portions of the edge of the pattern and thereby to avoid any dead-center effects and cause the free operation of the back-rest and parts actuated thereby under all shapes of patterns, it being understood that the cutter-supporting spindle 69 and pressure spindle 72 will be mounted a corresponding distance above the axis of rotation of the work to cause the work to be developed to the same shape as the pattern.

The construction and operation of the machine described is particularly simple and efficient in that it enables the operator to turn out a larger volume of work within a given period of time than has heretofore been practiced, particularly when it is considered that the machine may be used for cutting a large variety of different forms of articles from glass disks or blanks by a single rotation of the blank against the cutter and that the patterns may be easily and quickly interchanged for controlling the cutting of the blanks to corresponding forms, these operations being performed with practically no loss from breakage of the glass blanks or articles cut therefrom.

What I claim is:—

1. In a glass cutting machine of the character described, a rotary work-holder, a rocker-arm movable in an arc transversely of the plane of rotation of the work, a tool-holding spindle carried by said arm and having a cutting tool engaging one side of the work, and a pressure-spindle carried by said arm and engaging the other side of the work in axially opposed relation to the tool-holding spindle.

2. In a glass cutting machine of the character described, a rotary work-holder, and a tool-spindle rockable about an axis intersecting the plane of rotation of the work and having its cutter offset to one side of said axis for engaging one face of the work, and a pressure spindle engaging the other face of the work in co-axially opposed relation to the tool spindle.

3. In a glass cutting machine of the character described, a rotary work-holder, a support movable transversely of the plane of rotation of the work, a tool-holder mounted on said support at one side of said plane, and a back-rest mounted on the support at the opposite side of said plane for engaging the work in opposed relation to the tool.

4. In a glass cutting machine of the character described, a rotary work-holder, a radius arm, a yoke journaled on said arm to rock about an axis transversely of the axis of the work-holder, a tool-holder journaled on the yoke to rock about an axis intersecting the plane of rotation of the work and having its cutting tool offset to one side of its axis for engaging one face of the work, and a back-rest mounted on the yoke and spring-pressed into engagement with the other face of the work in opposed relation to the cutting tool.

5. In a glass cutting machine of the character described, a rotary work-holder, a tool holder having its cutting tool engaging the work, pivoted means for moving the tool-holder in an arc transversely of the axis of the work-holder, and means for adjusting the pivot toward and from the work to vary the radius of the arc of movement of the tool holder.

6. In a glass cutting machine of the character described, a rotary work-holder, a tool-holder having its cutting tool engaging the work, a radius arm pivoted to swing about an axis at right angles to that of the work-holder, a pattern rotatable with the work-holder, and means actuated by the pattern for moving the radius arm about its pivot, said tool holder being mounted upon the radius arm.

7. In a glass cutting machine of the character described, a rotary work-holder, a pivot having its axis intersecting that of the work-holder, a radius arm having a length-wise slot for receiving said pivot, and a tool holder carried by the radius arm and movable therewith across the face of the work, said pivot being adjustable lengthwise of the slot to vary the radius of the arc of movement of the tool holder.

8. In a glass cutting machine of the character described, a rotary work-holder, a radius arm pivoted to swing about an axis intersecting the axis of the work-holder, a tool-holder carried by the radius-arm to move therewith across the face of the work, a pattern rotatable with the work-holder and means actuated by the pattern for rocking the radius arm about its axis of movement.

9. In a glass cutting machine a rotary work holder, a radius arm pivoted to swing about an axis intersecting the axis of the work holder, a tool holder carried by the radius arm to move therewith across the face of the work, means including a rack and pinion for shifting the pivot for the radius-arm to different positions along the axis of the work-holder, and means for holding the pivot in its shifted position.

10. In a machine of the character described, a rotary work-holder, a pattern rotatable with the work-holder, a radius arm pivoted to swing about an axis intersecting the axis of the work-holder, a spring for rocking the radius arm in one direction, a tool-holder carried by the radius-arm to move across the face of the work, and means actuated by the pattern for rocking the radius-arm about its pivot against the action of the spring.

11. In a machine of the character described, a rotary work-holder, a pattern rotatable with the work-holder, a reciprocally movable back-rest for and actuated by the pattern as the latter is rotated, a radius-arm pivoted to swing about an axis intersecting the axis of the work-holder, a tool-holder carried by the radius-arm to move across the face of the work as the radius-arm is rocked about its pivot, and means including a tape for transmitting motion from said back-rest to the radius-arm.

12. In a machine of the character described, a rotary work-holder, a pattern rotatable with the work-holder, a reciprocally movable back-rest for and actuated by the pattern as the latter is rotated, a radius-arm pivoted to swing about an axis intersecting the axis of the work-holder, a tool-holder carried by the radius-arm to move across the face of the work as the radius-arm is locked about its pivot, a sheave adjacent the back-rest, a second sheave adjacent the free end of the radius-arm, and a tape passed around said sheaves and having one end attached to the back-rest and its other end attached to the radius-arm for transmitting motion from the back-rest to said radius-arm.

13. A glass cutting machine as in claim 12 in which means is provided for tensioning the tape.

14. A glass cutting machine as in claim 12 in which means is provided for adjusting the first-named sheave in the direction of movement of the back-rest and thereby effecting an adjustment of the radius arm to vary the size of the work.

15. In a machine of the character described, a rotary work-holder including co-axial clamping heads relatively movable axially to tighten and release them upon and from the work, a rock shaft extending transversely of the axis of the work-holder and work-centering pins carried by said rock shaft to move toward and from the axis of the work-holder according to the diameter of the work to be cut as the shaft is rocked in reverse directions.

16. In a machine of the character described, a rotary work-holder including co-axial clamping heads relatively movable axial to tighten and release them upon and from the work, a pattern rotatable with the work-holder, a movable back-rest for and actuated by the pattern, a radius-arm pivoted to swing about an axis intersecting the axis of the work-holder, means for adjusting the pivot to different positions along the axis of the work-holder, a yoke journaled on the radius-arm to rock about an axis at right angles to the axis of said pivot, a rocker-arm pivoted to the yoke, a tool-holder journaled on the rocker-arm to rock about an axis intersecting the plane of rotation of the work and having its cutting tool offset to one side of its axis of movement on the rocker-arm, and means for transmitting motion from the back-rest to the radius-arm for moving the tool-holder across the face of the work.

17. In a glass cutting machine of the character described, a rotary work-holder, a radius arm, a yoke journaled on said arm to rock about an axis transversely of the axis of the work-holder, a tool-holder journaled on the yoke to rock about an axis intersecting the plane of rotation of the work and having its cutting tool offset to one side of its axis for engaging one face of the work, and a back-rest mounted on the yoke and spring-pressed into engagement with the other face of the work in opposed relation to the cutting tool and reacting upon the yoke to urge the tool-holder toward the work.

18. A glass cutting machine comprising in combination a rotary work-holder, axially opposed spindles disposed at opposite sides of the plane and some distance to one side of the axis of rotation of the work, a support in which one spindle is free to rotate about its axis, a cutting tool on the rotatable spindle arranged to engage the work at one side of the axis of both spindles whereby the rotation of the work against the cutting tool will cause angular movement of the spindle about its axis in the direction of rotation of the work, and means for moving the other spindle into and out of engagement with the work.

19. A glass cutting machine as in claim 18 in which yielding means is provided for urging both spindles axially toward each other.

20. In a glass cutting machine having a rotary work-holder, co-axial spindles engaging opposite faces of the work, one of the spindles being freely movable about its axis and provided with a cutting tool offset to one side of said axis whereby the rotation of the work will cause the cutting tool to assume a position at the side of said axis in the direction of rotation of the work, the other spindle having a rounded bearing point on the axis therefor for engaging the work.

21. A glass cutting machine comprising in combination, a rotary work-holder, coaxial spindles extending axially in opposite directions from the plane and at one side of the axis of rotation of the work, a cutter on one of said spindles having its cutting point engaging the work at one side of the axis of the other spindle, and means including a spring for urging both spindles axially toward each other to cause the cutter on one spindle and the adjacent end of the other spindle to yieldingly engage opposite faces of the work, the cutter-supporting spindle and cutter thereon being free to turn about the axis of both spindles and thereby to keep the cutting point of the cutter at the same distance from the axis of the other spindle in all angular positions of said cutter-supporting spindle.

22. A glass cutting machine comprising in combination, a rotary work-holder, coaxial spindles extending axially in opposite directions from the plane and at one side of the axis of rotation of the work, a cutter on one of said spindles having its cutting point engaging the work at one side of the axis of the other spindle, and means including a spring for urging both spindles axially toward each other to cause the cutter on one spindle and the adjacent end of the other spindle to yieldingly engage opposite faces of the work, the end face of said other spindle adjacent the work being tapered to a point in said axis.

23. In a machine of the character described, a rotary work-holder, axially opposed spindles disposed at opposite sides of the plane of rotation of the work and having their adjacent ends provided respectively with a cutting point and a bearing point for engaging opposite faces of the work, supporting means for both spindles movable about an axis intersecting the axis of the work-holder, and means operable at will for changing the position of the axis of movement of said supporting means axially of and toward and from the plane of rotation of the work-holder.

24. A cutting machine of the character described comprising a rotary work-holder, a radius arm movable about an axis intersecting that of the work-holder, a rock-shaft journaled on the radius arm to rock about an axis in a plane at right angles to the axis of movement of the radius arm, a rocker arm pivoted to said rock-shaft to swing about an axis at right angles to the axis thereof, co-axial spindles mounted on the rocker-arm at opposite sides of the plane and at one side of the axis of rotation of the work, and a cutter on one of the spindles for engaging one side of the work, the other spindle engaging the other side of the work.

WILLIAM A. LOCKHART.